United States Patent Office 3,430,195
Patented Feb. 25, 1969

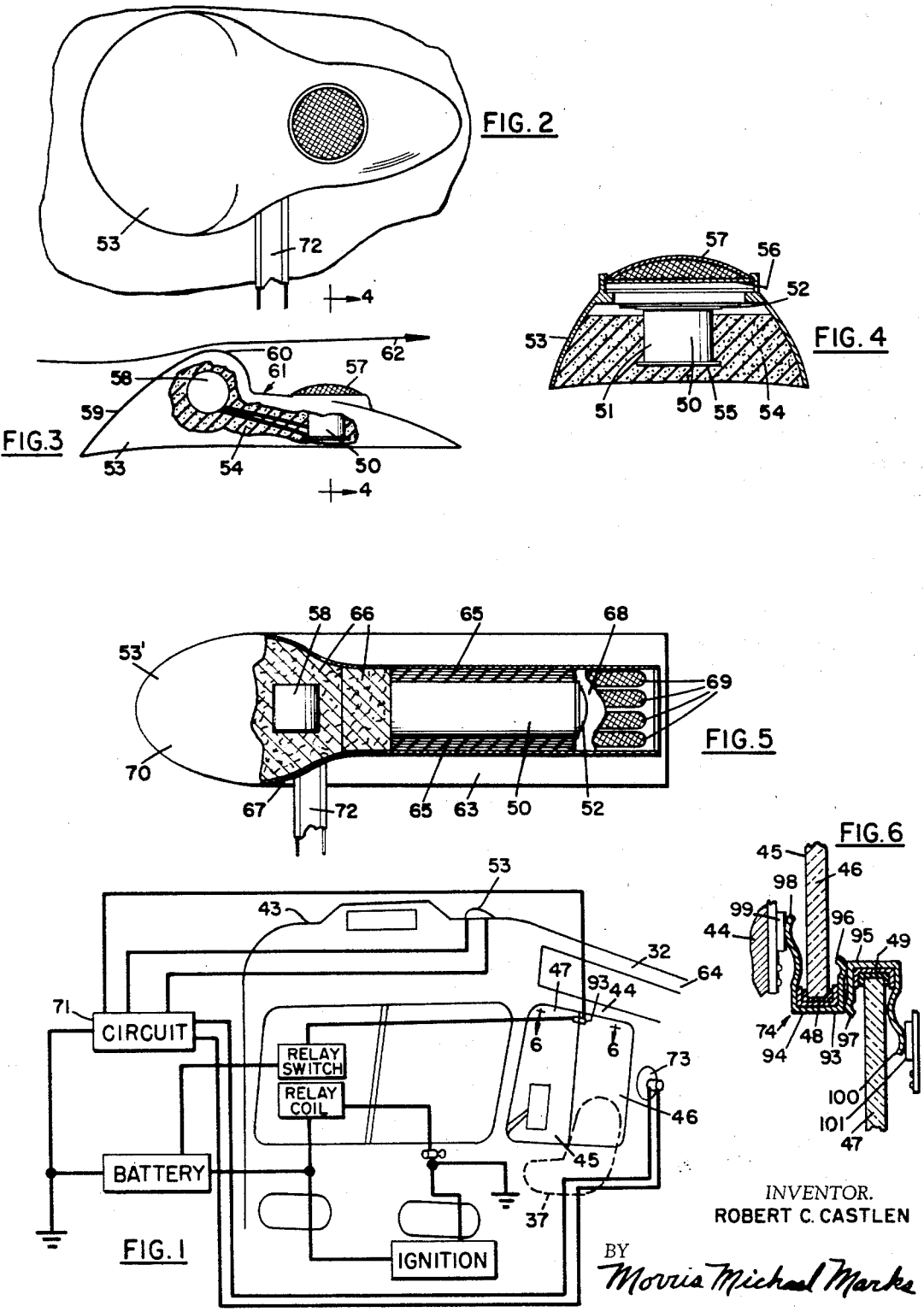

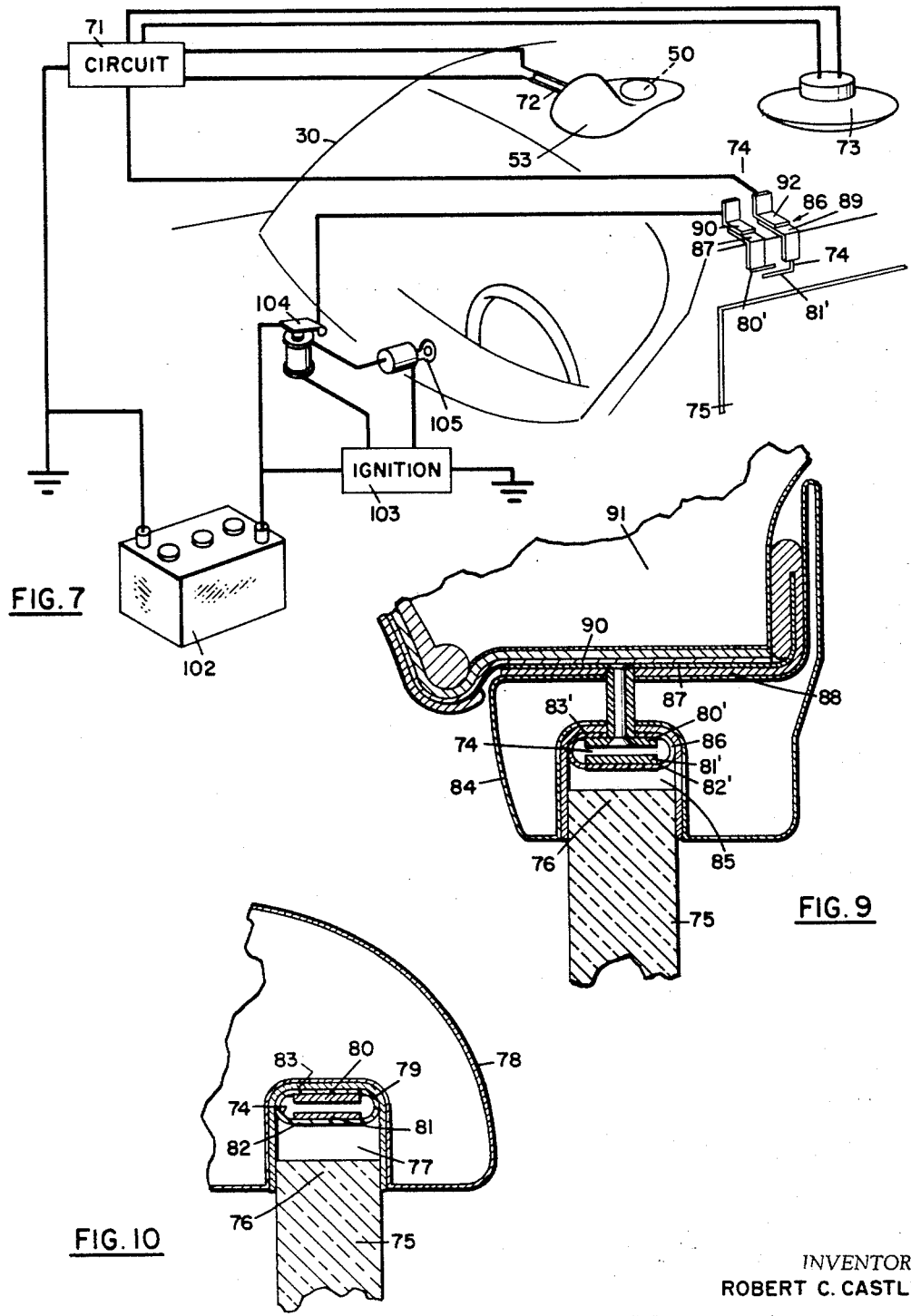

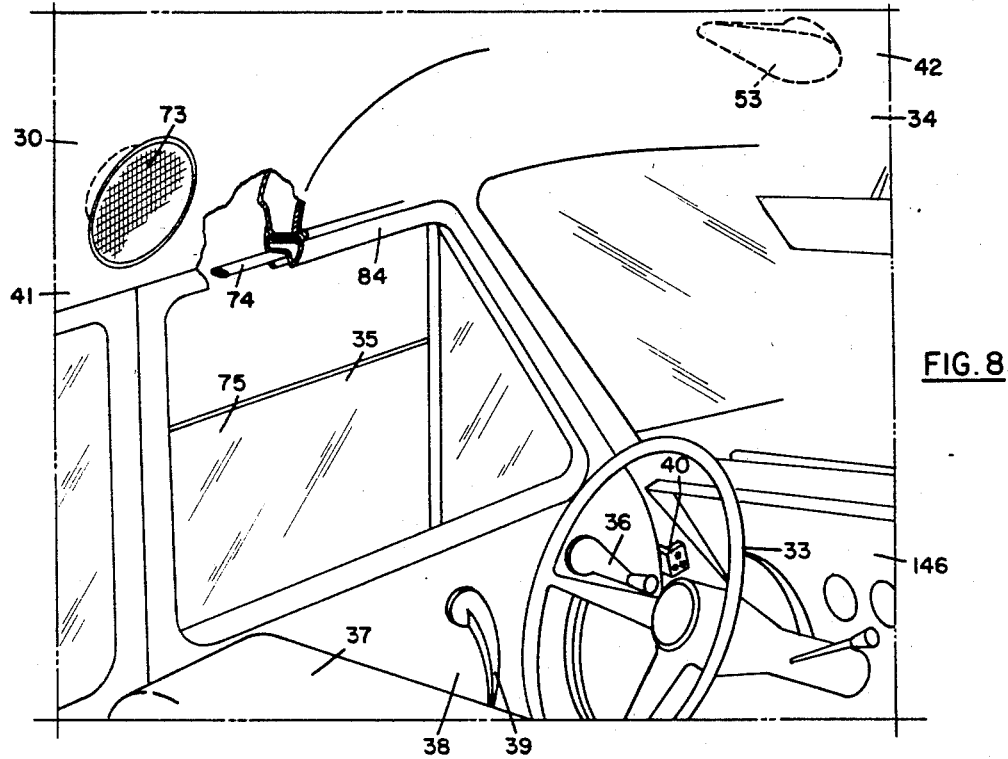
FIG. 8
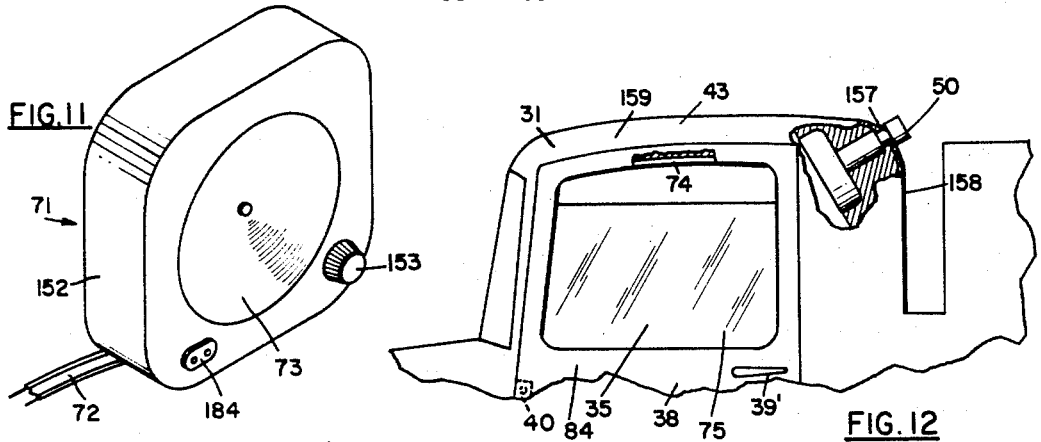
FIG. 11
FIG. 12
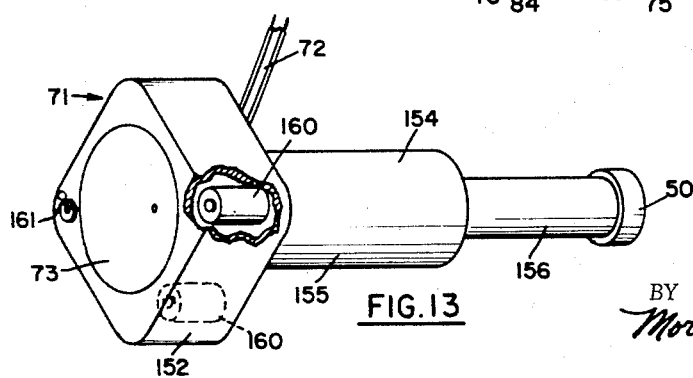
FIG. 13
INVENTOR.
ROBERT C. CASTLEN
BY
Morris Michael Marks
ATTORNEY.

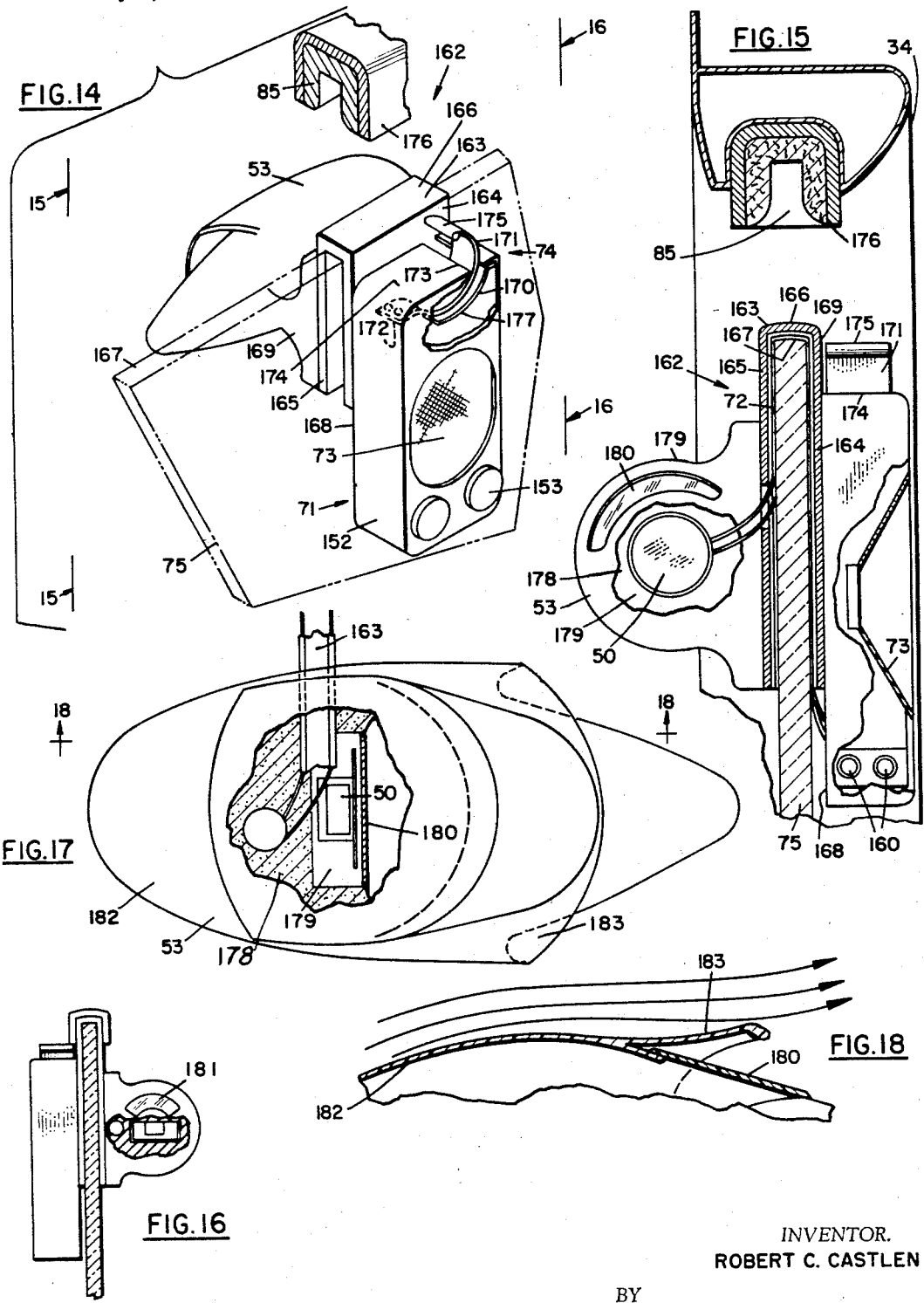

3,430,195
VEHICLE WARNING SYSTEM
Robert C. Castlen, 1711 Georgia Ave.,
West Palm Beach, Fla. 33401
Filed May 9, 1966, Ser. No. 548,572
U.S. Cl. 340—52          20 Claims
Int. Cl. B60g 5/00; G08g 1/00

My invention relates to warning signal indicators, and it relates more particularly to such indicators as may be used to receive signals which are audible exterior of a vehicle, and to convey such signals to the interior thereof, particularly when the vehicle is being operated in a manner which would tend to exclude the audible signals.

Thus, the pilot of a craft being maneuvered in a channel during a storm would be in need of the guidance of bell buoys and horns in the channel; yet because of the presence of the storm the windows of the pilot-house or other portion of the craft in which the wheel is located may be closed, excluding the very signals needed by him. Nor is my invention limited to water-type vehicles. The driver of an air-conditioned car must keep the windows closed during the operation of the air conditioner. During a rain storm, or in cold weather the drivers of other motor vehicles must often keep their windows closed. In either event, the closing of the windows tends to exclude essential warning signals, or to subdue them to such an extent that they are sometimes not discerned by the operator until it is too late to avoid a collision. The delay in discerning such signals is often increased in the closed vehicle because the operator is thereby required to breathe stale air, and sometimes even air which is contaminated by carbon monoxide fumes. Moreover, in vehicles such as school buses or trucks, the noise within the vehicle may be so great as to drown out exterior warning signals, particularly when the signals are weakened because of the closed windows.

Attempts have been made in the past to overcome this problem by providing a microphone exterior of the vehicle and converting the sounds picked up by the microphone to signals within the interior of the vehicle. In spite of the great need for such a device however, so far as is known it has not yet been adopted commercially; and it is apparent that the devices developed thus far have failed to solve basic problems inherent in their attempts to meet this need. Among these problems are the pick-up and transmission of operational noises of the vehicle itself, the amplification of ambient traffic noises concurrent with the warning signals, the discriminating against certain types of warning signals while amplifying others when attempting to filter out ambient noises, the exposure of the microphone to the weather, the creation of additional noise by the disposition of the microphone within the windstream of the vehicle, difficulty in mounting the device on the vehicle, excessive expense of the device, and the operation of the device when it is not needed as for instance when the windows are open or when the vehicle is not in use.

Taking the last-mentioned instance as an example, it is found that when the device is in operation while the driver's window is open, the driver has inflicted upon him the amplified sounds picked up by the microphone, in addition to the traffic noises coming in through the window. This can prove very dangerous, for whereas he is accustomed to discriminating between the usual sounds of traffic when said sounds are at normal intensity, the addition of any of such sounds in amplified state presents an abnormal intensity requiring a very different kind of sound discrimination. This tends to distract the driver's attention and thereby to reduce his ability to drive safely. Even when means are used to filter out sounds which are not customarily in the range of the warning signals which are intended to be amplified, it is not possible without very elaborate circuitry to filter out all such sounds; and thus when a harmless sound is amplified within the interior of the vehicle while the window is open the driver's attention is unnecessarily distracted from interpreting the ambient sounds coming through the open window, to listening to the amplified sound, interpreting it to determine whether it is a warning signal or a harmless sound, and then rejecting it as harmless. All of this requires conscious thought on the part of the driver, and tends to draw his attention away from his driving.

Indeed, there is generally no need for the device to be in operation when the window is open. Yet, to require the driver to manipulate a switch to turn the device on and off each time the window is closed or opened, would itself distract the driver, particularly when he opens or closes the window while the vehicle is in operation. Not only so, but the human factor is ever present whereby he may forget to turn the switch on every time the window is closed, thereby resulting in his being deprived of the benefit of the device without realizing that the device is not in operation during the very time it is needed.

In addition, when the device is in operation when the window is open, current, and the device's parts, are both being used unnecessarily, thereby reducing the life and efficiency of the device, and serving as a drain on the battery. On the other hand, when the vehicle is not in operation, as for instance when it is parked, it is customary for the windows to be closed; yet there is no need for the device to be in operation during such closed-window condition. Should it be in operation in such circumstances, current would be wasted and the life and efficiency of the parts reduced.

One object of my invention therefore is to provide a warning signal indicator that automatically will be placed in operation when the windows are closed, and the vehicle is in use, and will become disconnected when either the engine is turned off or the driver's window is opened.

Another object of my invention is to provide such a device which will reduce to a minimum the pick-up of sounds other than the warning signals intended to be conveyed to the operator of the vehicle.

A further object of my invention is to provide such a device, which may be provided in a self-contained unit and which may readily be installed by the operator of the vehicle.

Another object of my invention is to provide such a device that is weatherproof and of long operational life.

A further object of my invention is to provide such a device which is inexpensive to make, dependable in operation and easy to install.

For the purpose of illustrating my invention, I have shown in the accompanying drawings forms thereof which are at present preferred by me, since the same have been found to give satisfactory and reliable results, although it is to be understood that the various instrumentalities of which my invention consists can be variously arranged and organized, and that my invention is not limited to the precise arrangements and organizations of the instrumentalities as herein shown and described.

Referring now to the drawings in which like reference characters indicate like parts:

FIGURE 1 represents a diagramatic perspective view illustrating a bus having mounted thereon a warning signal indicator embodying my invention.

FIGURE 2 represents a plan view illustrating a microphone mounted on a vehicle in accordance with my invention.

FIGURE 3 represents a side elevational view, partly in section, of the microphone illustrated in FIGURE 2.

FIGURE 4 represents an enlarged sectional view, taken generally along the lines 4—4 of FIGURE 3.

FIGURE 5 represents a plan view, partly broken away, illustrating a microphone mounting of modified construction, in accordance with my invention.

FIGURE 6 represents an enlarged sectional view taken generally along the lines 6—6 of FIGURE 1, and illustrating one form of window-operated switch which may be used on a vehicle, in accordance with my invention.

FIGURE 7 represents an enlarged sectional view taken illustrating an automobile having mounted thereon a warning signal indicator having another form of window-operated switch, and embodying my invention.

FIGURE 8 represents a perspective view illustrating the interior of the motor vehicle shown in FIGURE 7 and having mounted thereon a warning signal indicator embodying my invention.

FIGURE 9 represents an enlarged vertical sectional view illustrating a window-operated switch of modified construction, which may be used in a warning signal indicator embodying my invention.

FIGURE 10 represents a vertical sectional view illustrating a window-operated switch of further modified construction, which may be used in a warning signal indicator embodying my invention.

FIGURE 11 represents a perspective view illustrating a chassis comprising circuitry, manual control, and an amplifier which may be used in a warning signal indicator embodying my invention.

FIGURE 12 represents an elevational view, partly broken away, illustrating a motor vehicle such as a truck, having mounted thereon a self-contained unit comprising a microphone, amplifier, batteries and circuitry in conjunction with a window-operated switch, and embodying my invention.

FIGURE 13 represents an enlarged perspective view illustrating the self-contained unit illustrated in FIGURE 12.

FIGURE 14 represents a perspective view illustrating a self-contained unit embodying microphone, amplifier, batteries, window-operated switch, circuitry and manual controls, of a warning signal indicator of modified construction embodying my invention.

FIGURE 15 represents a rear, enlarged, vertical sectional view illustrating the door of a motor vehicle having mounted thereon the self-contained unit illustrated in FIGURE 14, in accordance with my invention.

FIGURE 16 represents a reduced, front vertical sectional view, partly broken away, illustrating the door of a motor vehicle having mounted thereon a self-contained unit of modified construction, in accordance with my invention.

FIGURE 17 represents a side elevational view illustrating a microphone housing of modified construction, which may be used in a self-contained unit such as the one illustrated in FIGURE 14, and embodying my invention.

FIGURE 18 represents a sectional view taken generally along the lines 18—18 of FIGURE 17, and diagrammatically illustrating the same in conjunction with the windstream established by the forward movement of the vehicle on which the unit is mounted, in accordance with my invention.

Figure 19:
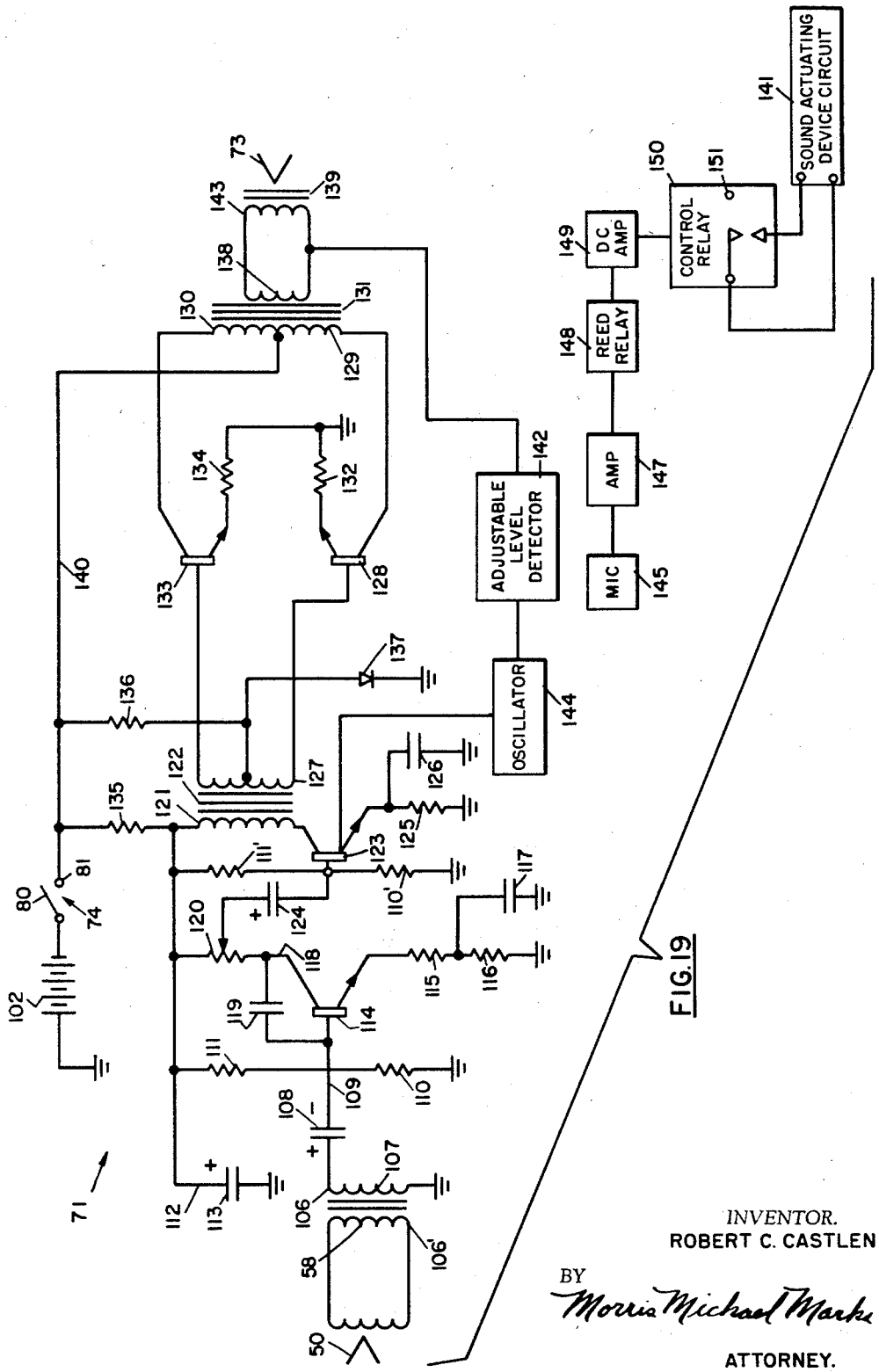
FIGURE 19 represents a diagram of a circuit which may be used in a warning signal indicator embodying my invention.

My invention is adapted for use on any vehicle such for instance as an automobile 30, truck 31, bus 32, or a water craft (not shown) having operating or driving controls 33 adapted to be manipulated by an operator (not shown) disposed in the interior 34 of the vehicle (see FIGURE 8), said interior 34 being adapted to be sealed off from the exterior by means of a window 35 which may be opened or closed at the will of the operator, by any suitable means such as the crank 36, said window 35 being disposed in the vicinity of the seat 37 carrying the operator when he is manipulating the controls 33. The seat 37 may sometime hereinafter be referred to as the "driver's seat" and the window 35 may sometime hereinafter be referred to as the "driver's window." The driver's window 35 may be disposed in a door 38 operated by door handles 39, 39' about a suitable hinge 40 (see FIGURES 8 and 12). The interior 34 may also comprise a side wall 41 and a ceiling 42, said ceiling being disposed beneath the roof 43 of the vehicle. In the case of a bus (see FIGURE 1), the driver's window may be mounted on the side wall 44 on the driver's side of the vehicle and adjacent the driver's seat 37, and may comprise a window construction 45 having two sliding panes 46, 47 respectively mounted in suitable sashes 48 and 49 (see FIGURE 6), riding in suitable horizontal tracks (not shown).

A suitable microphone 50 comprising, for instance, a magnet 51 and a diaphragm 52 is disposed on the exterior of the vehicle by any suitable means and in any suitable location. Thus for instance, the microphone 50 may be carried in a mounting 53 comprising a sponge rubber bed 54 having a suitable recess 55 of a size and shape substantially identical to that of the microphone 50. A weatherproof diaphragm 56 may be disposed about or above the microphone diaphragm 52 and spaced therefrom a suitable distance. A suitable screen or louver construction 57 may be disposed above the weatherproof diaphragm 56. In one preferred construction a matching transformer 58, connected to the magnet 51, may also be carried by the mounting 53. The mounting 53 together with the screen or louver 57 is preferably contoured in a manner to divert the windstream 62 past the screen 57 and thereby substantially to insulate the microphone from noises incident to the movement of air past the microphone as the vehicle progresses forwardly, as well as from contact with rain, dust or the like, contained in said air. Thus for instance, the mounting 53 may comprise an inclined forward face 59 leading to a fairing 60 having a rearward recess 61 in which is disposed the screen 57. The air stream 62 is guided along the inclined forward face 59 and past the fairing 60 away from contact with the screen 57. Thus the screen 57 is free to transmit to the microphone diaphragm 52, ambient sounds free of interference from the air stream 62.

In FIGURE 5 is illustrated a microphone mounting of modified construction 53'. Thus, a flexible mat 63 may be used as a base for contouring and bonding to the roof 43 or an exterior side wall 64 of the vehicle. The microphone 50 may be supported by a compressed roll of rubber sheet 65, and may be connected to the transformer 58 with the connections and transformer carried by a sponge rubber, felt or other suitable flexible mounting means 66, with the whole housed in a plastic shell 67. The microphone diaphragm 52 may open into a chamber 68 within the shell 67, and suitable sound transmitting walls such as screens, louvers, or waterproof flexible windows 69 may be disposed in that portion of the shell 67 which defines the chamber 68. The mounting 53' preferably comprises a forwardly disposed wind cone 70 of a larger width and thickness than the width and thickness of the chamber 68, and said chamber 68 with its sound transmiting walls 69 are preferably disposed behind the wind cone 70.

The microphone 50 may be connected to the circuitry 71 by any suitable means, such for instance as the flat tape conductor leads 72.

An amplifier 73 is mounted in the interior 34 of the vehicle, in the vicinity of the driver's seat 37, and may be disposed on the ceiling 42, side wall 41, door 38, or juncture or junctures thereof. In a preferred form, the amplifier 73 is located in the immediate vicinity of the driver's ear (not shown), when the driver is seated on the driver's seat 37.

A suitable window-operated switch 74 is mounted on the vehicle in the vicinity of the window pane, such for instance as the pane 75 illustrated in FIGURE 10, carried by a car door (not shown) of a hard top convertible automobile wherein the upper region 76 of the pane 75 fits into a longitudinal recess 77 in the top 78 of the vehicle, when the window is closed.

In the case of a hard top convertible, the window-operated switch 74 may take the form of a switch 79 comprising contact members 80 and 81 mounted in spaced relation on the interior of a soft rubber or plastic, preferably flattened tube 82, the upper portion of said tube 82 being secured as by a suitable adhesive (not shown) to the bed 83 of the recess 77. The normal resilience of the tube 82 maintains the contact members 80 and 81 in spaced relation, but permits the tube 82 to be collapsed by the closing of the window pane 75 thereby bringing the members 80 and 81 into electrical contact with each other. The contact members 80 and 81 may be respectively connected to the circuitry by suitable conductors such as the flat tape conductors 72.

When the window pane 75 is surrounded by a door frame 84 as for instance in a conventional automobile or truck (see FIGURE 9), the upper region 76 is guided into a longitudinal recess 85 in the upper portion of the door frame 84. If desired in this instance, the switch 74 may take the form of a switch 86 comprising contact members 80' and 81' carried in a resilient tube 82' and secured to the bed 83' of the recess 85. The contact member 80' may be electrically connected to a sleeve contact 87 secured to the top of the door frame 84 and insulated therefrom by any suitable means such as the rubber strip 88. As indicated in FIGURE 7, the contact member 81' may similarly be electrically connected to a sleeve contact 89 similarly secured to the top of the door frame 84. A cooperating contact member 90 may be secured to the lintel 91 in insulated relation thereto and immediately above the location of the sleeve contact 87 when the door frame 84 is closed. In a similar manner a cooperating contact 92 may be secured to the lintel 91 immediately above the location of the sleeve contact 89 when said door frame 84 is closed. The cooperating contact members 90 and 92 are respectively connected to the circuitry by any suitable means. Thus, when the window pane 75 is closed, the contact members 80' and 81' are in electrical communication but are not in communication with the circuit 71 until the door frame 84 is closed, whereupon current can flow through the cooperating contact 92, sleeve contact 89, contact member 81', contact member 80', sleeve contact 87 and cooperating contact 90.

In the case of overlapping sliding windows such for instance as the window panes 46 and 47 in a bus (FIGURES 1 and 6), the window-operated switch 74 may take the form of a switch 93 comprising a U-shaped contact member 94 mounted on the rear portion of the sash 48 and in insulated relation thereto, a U-shaped contact member 95 similarly mounted on the rear portion of the sash 49, said contact members 94 and 95 having respective sleeve contact portions 96 and 97 adapted to contact each other when the rear portions of the sashes 48 and 49 are in substantial juxtaposition as when the window panes 46 and 47 are closed. A sliding contact portion 98 projects from the side of the contact member 94 opposite to the contact portion 96, and is adapted to bear against the contact plate 99 mounted in insulated relation to a portion of the side wall 44. Similarly, a sliding contact portion 100 projects from the side of the contact member 95 opposite to the contact portion 97 and is adapted to bear against the contact plate 101 mounted in insulated relation to another portion of the side wall 44. The contact plates 99 and 101 are connected by any suitable means to the circuit 71.

The circuitry may comprise a source of current, such for instance as a battery which may be the battery 102 which supplies current for the vehicle ignition 103. The microphone 50 and amplifier 73 may be connected to the battery 102 by means of a circuit 71 adapted to convert warning signals received by the microphone 50 into amplified sound emanating from the amplifier 73. The window-operated switch 74 is connected with the circuit 71 in a manner to disconnect the amplifier 73 when the window is open or the driver's door 38 is open. In a preferred form, the circuitry is such that the amplifier 73 is also disconnected when the vehicle ignition 103 is turned "off." Thus for instance, the cooperating contact 90 of the window-operated switch 86 may be connected to the battery 102 by means of a relay operated switch 104 which is energized into closing contact, when the ignition 103 is turned "on" by the vehicle ignition key 105. In this manner, the amplifier 73 will be turned "off" when the vehicle is at rest and not operating, as for instance when it is in parked condition, even though the driver's door 38 and driver's window 35 are closed; but when the ignition 103 is turned "on" the amplifier 73 will convey to the driver sounds picked up by the exterior microphone 50 at all times when his door 38 and window 35 are closed.

The circuit 71 may comprise a transformer 106 having a coil 106' connected to the microphone 50, and another coil 107 connected at one end to the ground and at the other end to the positive side of a condenser 108 whose negative side 109 is connected by means of a resistor 110 to the ground and also by a resistor 111 to the positive side 112 of a condenser 113 leading to the ground. The negative side 109 also leads to a transistor 114 which has a lead connected to a resistor 115 which in turn is connected to the ground by means of a resistor 116 and a condenser 117. The transistor 114 also may have a lead 118 connected to the negative side 109 by a condenser 119. The lead 118 may also be connected to one end of a potentiometer coil 120, the other end of which is connected to the positive side 112 of the condenser 113 and also to one end of the primary 121 of a transformer 122. The other end of the primary 121 may be connected to one lead of a transistor 123 which also has a lead connected to the variable of the potentiometer 120 by means of a condenser 124. A resistor 111' may also be connected to said positive side 112 and to the transistor 123, and in series with a resistor 110' connected to the ground. The transistor 123 may also be connected to the ground by means of a resistor 125 and a parallel condenser 126.

The secondary coil 127 of the transformer 122 may be connected at one end to a transistor 128 which has a lead connected to one end 129 of a primary coil 130 of a transformer 131. Another lead of the transistor 128 may be connected by means of a resistor 132 to the ground. The opposite end of the secondary coil 127 may be connected to a transistor 133 which has a lead connected to another end of the primary coil 130 of the transformer 131. Another lead of the transistor 133 may be connected to the ground by means of the resistor 134. An intermediate portion of the primary coil 130 may be connected by means of the lead 140 in series with a resistor 135 and the positive side 112 of the condenser 113, and may also be connected by means of a resistor 136 to an intermediate portion of the secondary coil 127, and to one terminal of a diode 137, the other terminal of which may be connected to the ground. The secondary coil 138 of the transformer 131 may be connected in parallel with the transformer 139 operating the amplifier 73.

The lead 140 may be connected to one contact member 81 of the window operated switch 74, and the other contact member 80 of said window operated switch may be connected to the battery 102, either directly or by means of the relay operated switch 104 (FIGURES 1 and 7).

If desired, means may be provided for disconnecting one or more sound-actuating devices 141 such as radio, tape player or the like within the interior of the vehicle when a warning signal is picked up by the microphone 50. One such means is illustrated in FIGURE 19 wherein an adjustable level detector 142 may be connected intermediate the primary coil 143 of the amplifier transformer 139 and an oscillator 144 which is also connected with the transistor 123. A microphone 145 may be mounted on the dashboard 146 and connected to an amplifier 147 which is connected to a reed relay 148 which is also connected to a DC amplifier 149 in a manner to operate a control relay 150 which is adapted to disconnect the sound-actuating device circuit 141 whenever the reed relay 148 passes current to the DC amplifier 149, and to reconnect said circuit 141 when the reed relay 148 no longer passes such current.

The adjustable level detector 142 is preset to respond to sound of a specific amplitude or wave length or lengths as picked up by the microphone 50, and the oscillator 144 is preset to emit a preferably inaudible sound, i.e., one that is of a wave length beyond the range of the capacity of the human ear to detect. The reed relay 148 is preset to transmit current to the DC amplifier only when said inaudible sound is transmitted by the oscillator 144 and picked up by the microphone 145. Selected sound levels may be chosen for the operation of the level detector 142 from among the sounds emitted by expected warning signals which may be encountered on the highway and which would not otherwise customarily be included in ambient street and traffic noises. Such signals would include sirens, train whistles and bells, crossing bells, auto horns, or the like. Thus, should a radio or tape player be in operation in the interior of the vehicle, and such a warning signal be emitted exterior of the vehicle, the microphone 50 would pick up the signal, the adjustable level detector would transmit it to the oscillator which in turn would emit the inaudible sound which is picked up by the microphone 145 and amplified to the reed relay 148 which would transmit it to the amplifier 149 in a manner to operate the control relay 150, thereby disconnecting the radio or tape player until the warning signal is no longer heard by the microphone 50. If desired, the control relay 150 may be reconnected with a reset button 151 which is so related to the control relay 150 that the sound actuating device circuit 141 will not be reconnected until the reset button 151 is manually operated.

If desired, the circuit 71 may be disposed in the housing 152 which also houses the amplifier 73. A manual control 153 may also be provided for turning the circuit "on" and "off" and for adjusting the volume of the ground emanating from the amplifier 73, as illustrated in FIGURE 11.

In FIGURES 12 and 13 are illustrated a modification of my invention wherein the microphone 50, amplifier 73 and circuit 71 are all contained in a unitary unit 154. According to this modification, the circuit 71 may similarly be housed in the same housing 152 as the amplifier 73, or a part or all of said circuit may be housed in a base portion 155 supporting said housing 152. The microphone 50 may be mounted directly on the rearward end of said base portion 155, or if desired may be mounted on a suitable weatherproof stem 156 which projects from said rearward portion of said base portion 155. A suitable orifice 157 may be formed through the roof 43, wall 158, or juncture of the two, of the cab 159 of the vehicle, in the general proximity of the driver's ear, when he is seated on the driver's seat 37. The unitary structure 154 is preferably mounted with the microphone 50 projecting upwardly and rearwardly in a manner to be free of obstructions between it and the expected sources of the warning signals. If desired, batteries 160 may be disposed within the housing 152 or base 155 so as to make the device a self-powered unit, and a manual switch 161 may be provided for turning the device "on" or "off" respectively when the vehicle is in operation or idle. Suitable tape conductor leads 72 connect the unitary structure 154 with the window-operated switch 74.

In FIGURES 14, 15, 17 and 18 are illustrated another modified construction, wherein the entire device is disposed in a self-contained unit 162. According to this construction, the amplifier 73 may be contained in the same housing 152 as the circuit 71 and batteries 160, and may also have an "on" and "off" and volume control switch 153. The housing 152 is preferably mounted on and suspended from a suitable saddle 163 comprising an interior plate 164 and an exterior plate 165, mounted on and downwardly projecting from a suitable crossover member 166. The plates 164 and 165 are spaced a distance substantially equal to the thickness of the window pane 75, and the crossover member is adapted to rest upon the upper edge 167 of the window pane 75. In one form, the rearward face 168 of the housing 152 is mounted on the outer face 169 of the interior plate 164. The microphone housing 53 is mounted on the exterior plate 165 in any suitable manner and is connected to the circuitry 71 by any suitable means such as the tape conductor leads 72 passing through a suitable groove along the interior of the saddle 163.

The window-operated switch 74 may take the form of the switch 170 wherein a spring metal conductor type lever 171 is mounted at one end 172 in an insulated manner to the interior of the housing 152, and projects upwardly through a slot 173 in the top 174 of said housing, to a bearing portion 175 which is adapted to bear against, and be depressed by, the lower edge 176 of the leg of the recess 85 which is disposed toward the interior 34 of the vehicle, when the window pane 75 is raised, carrying with it the housing 152 and upwardly projecting bearing portion 175. A suitable contact member 177 is also mounted in an insulated manner to the housing 152, and extends beneath the lever 171 in a manner operably to be contacted thereby when the lever 171 is depressed by its bearing portion 175 bearing against the lower edge 176 of the recess 85 as the window pane 75 is urged upwardly to its closed position. The interior of the recess 85 being flexible, accommodation is made therein for the entrance of the saddle 163 thereinto as the window pane 75 is urged to its closed position.

In the self-contained unit 162, the microphone 50 may be seated in a sponge rubber or similar type receptacle 178 having a sound chamber 179 disposed between the microphone 50 and a rearwardly facing exterior, weatherproof window 180. If desired, the microphone 50 may be faced in other directions, or the window may be extended in any other desired direction as for instance forwardly, as indicated at 181 in FIGURE 16. In a preferred form, the window 180 may be formed of cellophane, and the microphone 50 and sponge type receptacle 178 are disposed in a suitable shell or housing 182 which is contoured to divert the air stream away from the window 180. If desired, a canopy 183 may be formed in a manner to divert the air stream away from the window 180, as well as to cover the window 180 from rain or road dirt which might otherwise accumulate thereon as the result of gravity, wind or other forces.

Also if desired, means may be provided as illustrated at 184 in FIGURE 11, for connecting the circuit 71 to a suitable source of current such for instance as the cigarette lighter on the dashboard 146, and such means may also be used for supplying current to rechargeable batteries (not shown) when such batteries are used in place of the batteries 160.

When there is no electrical connection between the circuit 71 and the vehicle's ignition system, for disconnecting the circuit 71 when said system is turned off, as for instance when a completely self-contained unit is used, it will be noted that provision is nonetheless made for warning the driver to turn the circuit off. Thus, when both the vehicle and circuit 71 are in operation, the driver's window is closed and outside noises are amplified into the interior of the vehicle to such an extent that they will be heard above the operational noises of the vehicle itself. When the ignition is turned off, the operational noises will have ceased, but the amplification of exterior noises into the interior of the vehicle will still continue unabated. The ratio of the amplified noise to the normal sounds heard within the vehicle will therefore be markedly increased. No longer having need for such amplification, and being thus confronted with an increased ratio of sound, the driver's attention is thereby directed to the fact that the amplifier is still "on," so that he will be warned to turn it off when the ignition itself is turned off. Unnecessary drain on the batteries and working parts is thereby avoided.

It is to be understood that my invention is not limited to the use of the specific circuit illustrated in FIGURE 19. Any circuit for accomplishing the purpose may be used, and the circuit therein illustrated is to be considered as merely one example of a usable circuit.

Nor is my invention limited to specific means for warning the driver. Thus for instance, a visual indicator such as light or other visual signal (not shown) may be used; or filters may be used to filter out ambient sounds which are not needed to convey to the driver the information that a warning signal is being sounded exterior of the vehicle. Such a filter may for instance be provided using elements such as the adjustable level detector and the reed relay already described in conjunction with the disconnecting of the sound-actuating device 141.

While the microphone 50 may be mounted in a sponge type receptacle 178 and the housing 182 which may itself be formed of plastic, thereby inhibiting the transmission of noises from the vehicle to the microphone, a suitable filter circuit (not shown) may be utilized to assure the elimination of vehicle operational noises from amplification into the interior 34. It is to be understood that the utilization of a plastic material for the shell 182 also aids in reduction of air stream noise.

It is also to be understood that my invention is not limited to the specific location of the window-operated switch 74 in the circuitry. For instance, the switch 74 may be disposed intermediate the microphone 50 and the circuit 71; and if desired, such an arrangement can be made in conjunction with a load operated circuit (not shown) whereby the connecting of the microphone by means of the closing of the window-operated switch 74 imposes a load on the circuit and thereby initiates its operation, whereas the disconnecting of the switch 74 also disconnects the load and thereby disconnects the circuit, thus avoiding drain on the batteries.

It will thus be found that by my invention I have provided a warning signal indicator which automatically goes into operation when the windows are closed while the vehicle is in operation but becomes disconnected when either the driver's window is open or the vehicle's ignition is turned off, thereby conserving current as well as the life of the integral parts of the device. Not only is the use of the indicator confined to the time when it is actually needed, but it prevents confusion and distraction which may result from the amplification of sounds while the driver's window is open. Thus, when the driver's window is open he is allowed to rely on his customary sound-discrimination faculties to interpret the sounds reaching him. By the use of my invention, no distraction can possibly occur by reason of a sound emanating from a harmless source but which is picked up by the microphone and amplified into the interior 34 while he is attempting to interpret unamplified ambient sounds. On the other hand, when the window is closed, the ratio of amplified sound to ambient reaching the driver, is high; and his aural attention is focused on the amplified sounds rather than the ambient. Since in every instance, when the window is closed, the amplified sounds will be louder than the exterior ambient, there is no possibility of his attention being distracted by the ambient sounds themselves. Distraction and confusion are thereby avoided.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent is:

1. A warning signal indicator for the interior of a vehicle having a window adapted to be closed in conjunction with a window receiving portion, said indicator comprising:
   a microphone adapted to be mounted on said vehicle in a manner to be disposed on the exterior thereof;
   a signal device adapted to be mounted on said vehicle an to emit a signal within the interior thereof;
   an electrical circuit disposed between said microphone and said signal device in a manner to convert sound reaching said microphone from the exterior of said vehicle, to a signal emitted in said interior;
   means to supply electric current to said circuit;
   a switch adapted to be mounted on said vehicle in a manner to be closed by the closing of said window against said window-receiving portion, said switch being connected with said circuit in a manner to place it in condition for microphone-signal device operation when said window is closed.

2. A warning signal indicator as defined in claim 1, and further characterized by:
   said switch also being adapted to be opened by the withdrawal of said window from said window-receiving portion;
   the relation of said switch to said circuit being such that when said switch is open, sound reaching said microphone will not be converted to a signal emitted by said signal device.

3. A warning signal indicator as defined in claim 1, and further characterized by:
   said vehicle comprising automotive means adapted selectively to be in operation or out of operation;
   means disposed intermediate said circuit and said automotive means, and adapted to render said circuit out of operation when said automotive means is itself out of operation, and to render said circuit operable when said automotive means is in operation.

4. A warning signal indicator as defined in claim 3, and further characterized by:
   said last-mentioned means comprising a relay disposed in series with a portion of the circuitry of said warning signal indicator, and energized by the operation of said automotive means.

5. A warning signal indicator as defined in claim 2, and further characterized by:
   said vehicle comprising automotive means adapted selectively to be in operation or out of operation;
   means disposed intermediate said circuit and said automotive means, and adapted to render said circuit out of operation when said automotive means is itself out of operation, and to render said circuit operable when said automotive means is in operation.

6. A warning signal indicator as defined in claim 1, and further characterized by:
   said window being carried by a door having a frame member in which said window-receiving portion is disposed, and said door being mounted on said vehicle in a manner to dispose said frame in juxtaposition to a base portion of said vehicle when said door is closed;
   a switch member mounted on said frame member, and a cooperating switch member mounted on said base portion in a manner to contact said first-mentioned switch member when said door is closed;
   said switch member and said cooperating switch member being disposed in series with said first-mentioned switch.

7. A warning signal indicator as defined in claim 1, and further characterized by:
   a mounting for said microphone, comprising:
      a base portion adapted to be secured to a portion of said vehicle, a resilient cushion carried by said base portion;
said microphone being mounted on said resilient cushion.

8. A warning signal indicator as defined in claim 1, and further characterized by:
a mounting for siad microphone comprising:
a housing adapted to be secured to a portion of said vehicle,
a resilient cushion disposed within said housing,
said microphone being carried on said resilient cushion,
means to shield said microphone from elements disposed exterior of said housing, and
a sound chamber disposed intermediate said microphone and said last-mentioned means.

9. A warning signal indicator as defined in claim 8, and further characterized by:
said last-mentioned means comprising a flexible plastic window.

10. A warning signal indicator as defined in claim 8, and further characterized by:
means to divert air stream from contact with said microphone.

11. A warning signal indicator as defined in claim 1, and further characterized by:
said switch comprising:
a flexible, insulating tube disposed within said window-receiving portion, and
a plurality of contact members mounted on the interior of said tube in a manner to be brought into contact when said tube is collapsed by the bearing thereagainst of said window when said window is brought into closed condition with relation to said window-receiving portion, and to be separated by the resilience of said tube when said window is withdrawn from said window-receiving portion;
the relation of said switch to said circuit being such that when said switch is open, sound reaching said microphone will not be converted to a signal emitted by said signal device.

12. A warning signal indicator as defined in claim 1, and further characterized by:
a saddle comprising:
an interior plate,
an exterior plate, and
a crossover member;
said saddle being adapted to be carried by said window, with said crossover member resting upon the upper edge of said window, said interior plate being disposed toward the interior of said vehicle, and said exterior plate being exposed to the exterior thereof;
said signal device being disposed on said interior plate; and
said microphone being disposed on said exterior plate.

13. A warning signal indicator as defined in claim 12, and further characterized by:
said switch being carried by said saddle in a manner to be actuated by said window-receiving portion when said saddle is raised by the closing of said window.

14. A warning signal indicator as defined in claim 1, and further characterized by:
said means to supply electric current, comprising:
a battery;
said signal device, electrical circuit and battery being disposed within a housing adapted to be mounted on the interior of said vehicle.

15. A warning signal indicator as defined in claim 1, and further characterized by:
said signal device, electrical circuit and microphone being disposed in a unitary housing adapted to be mounted on said vehicle.

16. A warning signal indicator as defined in claim 1, and further characterized by:
said electrical circuit comprising means to restrict the operation of said signal device in response to selected sound levels.

17. A warning signal indicator as defined in claim 1, and further characterized by:
said vehicle comprising an electrically operated sound-actuating device;
means responsive to a selected level of sound reaching said microphone, and operable to quiet said sound-actuating device when said level of sound reaches said microphone and said circuit is in operation.

18. A warning signal indicator as defined in claim 17, and further characterized by:
said last-mentioned means comprising a level detector and an oscillator connected to said circuit;
a microphone, a reed relay and a control relay, connected to said sound-actuating device;
said reed relay being adapted to pass current to said control relay when said oscillator emits a selected, substantially inaudible sound which is received by said microphone.

19. A warning signal indicator as defined in claim 1, and further characterized by:
said window comprising a plurality of sashes, and
said switch being adapted to be closed only when said window is closed by the substantial closing of all of said sashes.

20. A warning signal indicator as defined in claim 1, and further characterized by:
a mounting for said microphone, comprising:
a plastic housing, and
means to secure said microphone to a portion of said vehicle.

References Cited

UNITED STATES PATENTS 3,043,912 7/1962 De Laney _____ 179—1
3,158,835 11/1964 Hipkins _____ 340—34

JOHN W. CALDWELL, *Primary Examiner.*

A. H. WARING, *Assistant Examiner.*

U.S. Cl. X.R.

340—34; 179—1